United States Patent Office 3,482,994
Patented Dec. 9, 1969

3,482,994
PREPARATION OF FLOUR-CONTAINING
LEAVENED PRODUCTS
Chester W. Ofelt, New Castle, and Frederick C. Nachod, Kinderhook, N.Y., assignors to Sterling Drug Inc., New York, N.Y., a corporation of Delaware
No Drawing. Filed July 13, 1966, Ser. No. 564,747
Int. Cl. A21d 15/00, 2/14
U.S. Cl. 99—91                    5 Claims

ABSTRACT OF THE DISCLOSURE

Improved flour-containing leavened products are provided by incorporation therein of an oxyethylated alkylphenol-formaldehyde polymer such as tyloxapol.

---

This invention relates to improvements in the preparation of leavened products and in particular to improvements in the process of preparing flour-containing leavened products, to the resulting pre-baked leavened products (doughs) and to the baker leavened products produced therefrom.

It is an object of this invention to provide improvements in the process of making flour-containing leavened products by utilization of a dough conditioner which enables reduction in mixing requirements, reduction in fermentation time by increasing gas retention capacity of the dough, increased production throughout because of improved elasticity of the dough, and improved machineability of the dough.

It is a further object to provide improved flour-containing leavened products produced by said process improvements.

It is a further object of this invention to provide improvements in the process of making baked leavened products by utilization of a dough conditioner to produce improved flour-containing leavened products (doughs) which in turn, when baked, yield improved baked products, e.g., in the case of bread, improved loaf volume, crumb grain, crumb texture, crumb softness, and keeping quality.

Still another object of the invention is to provide said improved baked leavened products.

The invention sought to be patented, in its process aspect, is described as residing in the improvement in the preparation of leavened products and the corresponding baked leavened products which comprises incorporating in the baking mix from about 0.02 to about 0.15% by weight, based on the weight of flour, of an oxyethylated alkylphenol-formaldehyde polymer.

The invention sought to be patented, in one composition aspect, is described as residing in the leavened products, i.e., doughs, prepared from a baking mix containing from about 0.02 to about 0.15% by weight, based on flour, of an oxyethylated alkylphenol-formaldehyde polymer.

The invention sought to be patented in another composition aspect, is described as residing in the baked product prepared from the above-described leavened product of our invention.

The oxyethylated alkylphenol-formaldehyde polymers useful in the process of our invention are prepared by condensing a mole of an alkylphenol with 0.5–1.0 mole of formaldehyde and reacting the product thus obtained with 8–60 moles of ethylene oxide, as described in U.S. Patent 2,454,541. Particularly useful polymers are the oxyethylated p-tertiary-octylphenol - formaldehyde polymers produced by condensing approximately equimolar amounts of p-tertiary-octylphenol and formaldehyde and then reacting the product with about 8 to 20 moles of ethylene oxide. A preferred compound of this group is the product containing about eight to ten oxyethylene groups per p-tertiary-octylphenol nucleus and about three to seven p-tertiary-octylphenol groups which is known under the brand names "Superinone" and "Triton WR–1339," chemically as oxyethylated tertiary octylphenol formaldehyde polymer or p-isooctylpolyoxyethlenephenol formaldehde polymer, and genericall as tyloxapol (United States adopted name); the preparation of a closely similar and equivalently useful compound is described in Example 1 of U.S. Patent 2,454,541, wherein eleven moles of ethylene oxide are used.

The process aspect of the invention is carried out by incorporating in the baking mix from about 0.02 to about 0.15% and preferably from about 0.05 to about 0.10% by weight, based on flour, of the oxyethylated alkylphenol-formaldehyde polymer. The latter, a water-soluble viscous material, is conveniently added in aqueous solution or, alternatively, on a suitable solid carrier having a high absorptive capacity and a high surface area, i.e., hydrous calcium silicate (e.g., Micro-Cel® E, a product of the Celite Division of Johns-Manville).

The teachings of our invention are particularly useful in any of the commercial bread making processes, e.g., the sponge and dough process, the straight dough process, and modifications of these such as the brew processes; they are applicable in continuous or batch systems. They are also useful in the commercial preparation of other baked leavened products, e.g., doughnuts, sweet rolls, coffee cakes, and the like.

As used in the claims and elsewhere herein, the term "bread" is intended to include any article of food made from flour by adding water and yeast, with or without other additives, fermenting, kneading and baking. The term "bread," therefore, includes not only loaf bread, but also, rolls, buns, raised doughnuts, and the like, as well as various types of breads, e.g., white bread, rye bread, whole wheat bread, and other well-known types of bread.

The loaf bread prepared by the process of our invention is compared with the control loaf, and scored according to the following table:

External characteristics:                         Perfect score
   Volume _____ 15
   Crust color _____ 5
   Symmetry _____ 5
   Break and shred _____ 5

Internal characteristics:
   Grain _____ 20
   Texture _____ 20
   Color _____ 10
   Aroma and taste _____ 20

Other than said oxyethylated alkylphenol-formaldehyde polymer, the particular ingredients used in making the pre-baked or baked leavened products described herein form no part of the present invention since any suitable formula for the baked goods may be used. The basic ingredients used in the manufacture of bread, for example, are wheat flour, water, sodium chloride and yeast. For commercial bread, sugar, milk, shortening and a suitable emulsifier for the shortening, such as monoglycerides, are conventionally added to these basic ingredients, and the present invention is particularly suitable using baking bread mixes containing such additional ingredients. For sweet leavened products, eggs as well as other enriching agents may also be added.

The term "baking mix," as used in the claim and elsewhere herein, means all of the known essential and optionally useful ingredients, as illustrated in the immediately preceding paragraph, which constitute the mixture of ingredients for formula commonly used in the preparation of bread.

Our invention is further illustrated by the following specific embodiments without, however, limiting it thereto.

EXAMPLE 1

This example shows the effectiveness of tyloxapol as a dough conditioner and bread improver when added at the sponge stage in a sponge and dough system. Here and in the following examples, unless otherwise indicated, the tyloxapol was incorporated in the baking mix as an aqueous solution (7 g. in 1 liter of solution); varying percentages, i.e., 0.001, 0.01, 0.05 and 0.10% by weight, based on the weight of flour, were used

SPONGE AND DOUGH FORMULA

|  | 80% Sponge | 20% Dough |
|---|---|---|
| Weight, grams: | | |
| Flour | [1] 560 | [1] 140 |
| Water | 336 | 102 |
| Yeast | 17.5 | |
| Yeast food | 3.5 | |
| Shortening | | 21 |
| Sugar | | 42 |
| Salt | | 14 |
| Tyloxapol | ([2]) | |

[1] Flour adjusted to 14% moisture basis.
[2] 0.001, 0.01, 0.05 and 0.10% by weight on flour basis.

Procedure

Mix all the sponge ingredients for two and one half minutes at low speed on a mixer (e.g., Hobart A-200 Mixer with McDuffy bowl) at 80° F. Ferment the sponges for four and one half hours at 80° F. Mix the dough ingredients for one minute at low speed, adding the sponge in three pieces. Mix the doughs to optimum development at second speed at 80° F. Ferment the doughs for forty minutes at 80° F. Divide (scale 520 g. dough pieces), round and place in drawer proofer for fifteen minutes. Sheet at 5/16" on a sheeter (e.g., a National Sheeter), turn 90°, mold on a molder (e.g., Moline Molder) and pan. Proof loaves for sixty minutes at 100° F. Bake loaves for twenty-five minutes at 425° F. Record weight and volume of loaves directly from the oven.

Observations

At 0.01% of tyloxapol, a slight increase in volume was observed, but the increase at 0.05% and 0.10% was considerable. The grain remained as good if not better than the control from 0.001% to 0.05%. The grain was opened slightly at 0.10%. The texture of the bread was exceptionally soft and tender at 0.05% and 0.10% levels. The doughs with tyloxapol had comparable fermentation rise and characteristics with the control. The mixed doughs were well developed and soft but machined very well.

EXAMPLE 2

This example shows the effectiveness of varying percentages, i.e., 0.02 to 0.10% by weight, based on weight of flour, of tyloxapol as a dough conditioner and bread improver when added at the dough stage in a sponge and dough system.

SPONGE AND DOUGH FORMULA

|  | 80% Sponge | 20% Dough |
|---|---|---|
| Weight, grams: | | |
| Flour | [1] 560 | [1] 140 |
| Water | 336 | 102 |
| Yeast | 17.5 | |
| Yeast food | 3.5 | |
| Shortening | | 21 |
| Sugar | | 42 |
| Salt | | 14 |
| Tyloxapol | | ([2]) |

[1] Flour adjusted to 14% moisture basis.
[2] 0.02, 0.03, 0.04, 0.05, 0.075 and 0.10% by weight on flour basis.

Procedure

Mix all the sponge ingredients for two and one half minutes at low speed on a mixer (Hobart A-200 Mixer with McDuffy bowl) at 80° F. Ferment the sponges for four and one half hours at 80° F. Mix the dough ingredients for one minute, adding the sponges in three pieces. Mix the dough at second speed to optimum development at 80° F. Ferment the doughs for forty minutes at 80° F. Divide (scale 520 g. dough pieces), round and place in drawer proofer for fifteen minutes. Sheet at 5/16" (National Sheeter), turn 90°, mold (Moline Molder) and pan. Proof for sixty minutes at 100° F. Bake at 425° F. for twenty-five minutes. Record weight and volume of loaves immediately after removal from the oven.

| Dough Number | 1 | 2 | 3 | 4 | 5 | 6 | 7 |
|---|---|---|---|---|---|---|---|
| Data: | | | | | | | |
| Percent Tyloxapol | None | 0.01 | 0.03 | 0.04 | 0.05 | 0.075 | 0.10 |
| Wt. tyloxapol, g. | None | 0.14 | 0.21 | 0.28 | 0.35 | 0.525 | 0.70 |
| Percent Flour moisture | 13.5 | 13.5 | 13.5 | 13.5 | 13.5 | 13.5 | 13.5 |
| Percent ABS at 14% moisture basis | 62.5 | 62.5 | 62.5 | 62.5 | 62.5 | 62.5 | 62.5 |
| Mixing time (min.) | 7.5 | 7.25 | 7 | 7.25 | 7.25 | 7.25 | 7.25 |
| Average loaf wt. (g.) | 451.5 | 450.5 | 449.5 | 448.5 | 450 | 450 | 448 |
| Average loaf vol. (cc.) | 2,988 | 3,050 | 3,013 | 3,025 | 3,088 | 3,025 | 3,113 |
| Spec. vol. (cc./g.) | 6.62 | 6.77 | 6.70 | 6.74 | 6.86 | 6.72 | 6.95 |
| Score of Product: | | | | | | | |
| Volume | 14.2 | 14.5 | 14.4 | 14.4 | 14.7 | 14.4 | 14.9 |
| Crust Color | 5 | 5 | 5 | 5 | 5 | 5 | 5 |
| Symmetry | 5 | 5 | 5 | 5 | 5 | 5 | 5 |
| Break and Shred | 4.5 | 5 | 5 | 4.5 | 5 | 5 | 5 |
| Grain | 18.5 | 18.5 | 18.5 | 19 | 19 | 18 | 17 |
| Texture | 18 | 18.5 | 18.5 | 19.5 | 19.5 | 19.5 | 20 |
| Color | 9 | 9 | 9 | 9 | 9 | 9 | 9 |
| Aroma and Taste | 20 | 20 | 20 | 20 | 20 | 20 | 20 |
| Total Score | 94.2 | 95.5 | 95.4 | 96.4 | 97.2 | 95.9 | 95.9 |

| Dough Number | 1 | 2 | 3 | 4 | 5 |
|---|---|---|---|---|---|
| Data: | | | | | |
| Percent Tyloxapol | None | 0.001 | 0.01 | 0.05 | 0.10 |
| Mixing time (min.) | 7.5 | 7.5 | 7.5 | 7.5 | 7.25 |
| Percent Flour Moisture | 13.6 | 13.6 | 13.6 | 13.6 | 13.6 |
| Percent ABS[1] at 14% M.B.[2] | 62.5 | 62.5 | 62.5 | 62.5 | 62.5 |
| Average loaf wt., g. | 450 | 453 | 453 | 450 | 448 |
| Average loaf vol., cc. | 3,113 | 3,075 | 3,138 | 3,238 | 3,325 |
| Spec. vol., cc./g. | 6.92 | 6.79 | 6.93 | 7.20 | 7.42 |
| Score of Product: | | | | | |
| Volume | 14.8 | 14.6 | 14.9 | 15 | 15 |
| Crust Color | 5 | 5 | 5 | 5 | 5 |
| Symmetry | 4.5 | 4.5 | 4.5 | 4.5 | 4 |
| Break and Shred | 4.5 | 4.5 | 4.5 | 4.5 | 5 |
| Grain | 19.5 | 19.5 | 19.5 | 19.5 | 19 |
| Texture | 19 | 19 | 19.5 | 20 | 20 |
| Color | 9 | 9 | 9 | 9 | 9 |
| Aroma and Taste | 20 | 20 | 20 | 20 | 20 |
| Total Score | 96.3 | 96.1 | 96.9 | 97.5 | 97.0 |

[1] ABS=absorption.
[2] M.B.=moisture basis.

Observations

Tyloxapol produces more extensible, softer doughs with improved gas retention. In this example, even though the flour was less responsive than in Example 1, the use of tyloxapol resulted in a volume increase over the control. The texture is improved using up to 0.10% tyloxapol. The two higher levels produced more open grain, but were even more responsive in causing softer bread crumb texture. No off-odors or tastes were detectable. 0.05% of tyloxapol to the dough stage appears to be optimum.

EXAMPLE 3

This example shows the effectiveness of varying percentages of tyloxapol as a dough conditioner and bread improver when added at both the sponge and dough stages in sponge and dough systems using a commercial flour blend. It also compares these results with those obtained by using a commercial dough conditioner, i.e., calcium stearyl-2-lactylate (Verv® Ca).

SPONGE AND DOUGH FORMULA

|  | Sponge | Dough |
|---|---|---|
| Weight, grams: |  |  |
| Flour | [1] 560 | [1] 140 |
| Water | 336 | 98 |
| Yeast | 17.5 | |
| Yeast food | 3.5 | |
| Shortening |  | 21 |
| Sugar |  | 42 |
| Salt |  | 14 |
| Tyloxapol | ([2]) | ([3]) |

[1] Flour adjusted to 14% moisture basis.
[2] 0.04 to 0.07% by weight based on weight of flour.
[3] 0.04 to 0.08% by weight based on weight of flour.

Procedure

Mix all the sponge ingredients for two and one half minutes at low speed (Hobart A–200 Mixer with McDuffy bowl) at 80° F. Ferment the sponges for four and one half hours at 80° F. Mix the dough ingredients, adding the sponge in three pieces, for one minute at low speed. Mix the doughs to optimum development at second speed at 80° F. Ferment the doughs for forty minutes at 80° F. Divide (scale 520 g. dough pieces), round and place in drawer proofer for fifteen minutes. Sheet dough pieces at 5/16″ (National Sheeter), turn 90°, mold (Moline Molder) and pan. Proof for sixty minutes at 100° F. Bake at 425° F. for twenty-five minutes. Record weight and volume of loaves directly from the oven.

Formula:
- Mix — 3 lbs.
- Water — 2 lbs., 2 ounces.
- Flour — 2 lbs.
- Yeast — 4 ounces.
- Tyloxapol — 0.10% by wt., flour basis.

Procedure

Mix two minutes at low speed and fifteen minutes at second speed (Hobart 200) in a 20-quart bowl to 80° F. (20° friction rise). Allow to ferment for two hours; scale dough pieces of 12 ounces; proof ninety minutes (D.B. 95°, W.B. 85°); and, bake at 380° F. for eighteen minutes.

Observed advantages of tyloxapol formulation compared with the control:

(a) Mixed out one and one-half minutes sooner than the control.

(b) Improved the fermentation, presumably because of better gas retention.

(c) Yielded a more extensible dough that was not as bucky as the control.

(d) Proofed faster than the control (65 minutes vs. 80 minutes).

(e) Showed more strength in the finished baked product (the control collapsed) and gave better volume.

(f) The grain of the test loaf was finer, more uniform, and less open than the control, and apparently the cell walls were thinner. The texture was silky vs. a harshness in the control.

(g) At three days storage, under ambient conditions

|  | Dough | | Sponge Additions | | | | Dough Additions | | | | |
|---|---|---|---|---|---|---|---|---|---|---|---|
| Dough Number | 1 | 2 | 3 | 4 | 5 | 6 | 7 | 8 | 9 | 10 | 11 |
| Data: | | | | | | | | | | | |
| Percent Tyloxapol | None | None | 0.04 | 0.05 | 0.06 | 0.07 | 0.04 | 0.05 | 0.06 | 0.07 | 0.08 |
| Percent Verv Ca | None | 0.50 | None | None | None | None | None | None | None | None | None |
| Percent Flour moisture | 14 | 14 | 14 | 14 | 14 | 14 | 14 | 14 | 14 | 14 | 14 |
| Percent ABS at 14% M.B. | 62 | 62 | 62 | 62 | 62 | 62 | 62 | 62 | 62 | 62 | 62 |
| Mixing time (min.) | 9.5 | 9.5 | 9.5 | 9.5 | 9.5 | 9.5 | 9.5 | 9.5 | 9.5 | 9.5 | 9.25 |
| Av. loaf wt. (g.) | 448 | 450 | 452 | 450 | 447 | 449.5 | 450 | 446 | 449 | 448 | 446.5 |
| Av. vol. (cc.) | 3,025 | 3,200 | 3,113 | 3,175 | 3,213 | 3,213 | 3,200 | 3,188 | 3,213 | 3,225 | 3,325 |
| Spec. vol. (cc./g.) | 6.75 | 7.11 | 6.89 | 7.06 | 7.19 | 7.15 | 7.11 | 7.15 | 7.16 | 7.20 | 7.45 |
| Score of Product: | | | | | | | | | | | |
| Volume | 14.5 | 15 | 14.8 | 15 | 15 | 15 | 15 | 15 | 15 | 15 | 15 |
| Crust Color | 4.5 | 4.5 | 5 | 5 | 5 | 5 | 5 | 5 | 5 | 5 | 5 |
| Symmetry | 4.5 | 4.5 | 5 | 5 | 5 | 5 | 5 | 5 | 4.5 | 5 | 5 |
| Break and Shred | 4 | 4 | 4 | 4.5 | 4.5 | 4.5 | 4.5 | 4.5 | 4.5 | 4.5 | 5 |
| Grain | 18 | 19.5 | 19.4 | 19.5 | 19.6 | 18.5 | 19 | 19.4 | 19.5 | 19.6 | 18.2 |
| Texture | 18 | 19.5 | 19 | 19 | 19.5 | 19 | 19 | 19 | 19 | 19.2 | 19.5 |
| Color | 9 | 9 | 9 | 9 | 9 | 9 | 9 | 9 | 9 | 9 | 9 |
| Aroma and Taste | 20 | 20 | 20 | 20 | 20 | 20 | 20 | 20 | 20 | 20 | 20 |
| Total Score | 92.5 | 96.0 | 96.3 | 97.0 | 97.6 | 96.0 | 96.5 | 96.9 | 96.5 | 97.3 | 96.7 |

Observations

The addition of tyloxapol to the sponges produced a fermentation rise 2″ greater than without it. The doughs were gassy and elastic with good machineability. The optimum level of sponge addition was 0.06% and a slightly greater level was preferable for a dough addition (0.07%). The additions promoted uniformity, better grain and softer textures. In comparison with the calcium stearyl-2-lactylate addition (at the dough stage) the grain characteristics with tyloxapol were as good or a little better. The texture with the tyloxapol sample was much better than obtained with the control.

EXAMPLE 4

Tyloxapol was used in a sweet dough system and found to result in many advantages, both in the pre-baking process and in the resulting baked product. The sweet dough was run as a straight dough system, with the final blend containing 67% flour. Tyloxapol was used at a 0.10% level. The "mix" used here was a commercial sweet dough base at which was added only water, yeast and some flour. The actual composition of the sweet dough mix used is given at the end of this example.

in the laboratory, there was a marked superiority in eating quality over the control. The test loaves retained their moisture much better. It is estimated that it provided one additional day in shelf life of the finished product.

The sweet dough mix used above contained the following ingredients (percent given on a weight basis):

| Ingredient: | Percent |
|---|---|
| Flour | 44.90 |
| Defatted soy flour | 6.00 |
| Malter wheat flour | 0.42 |
| Dextrose | 26.66 |
| Shortening | 11.33 |
| Mono and diglycerides | 1.17 |
| Lecithin | 4.83 |
| Gums | 0.63 |
| Non fat dry milk solids | 1.00 |
| Yeast food (Arkady) | 0.83 |
| Monocalcium phosphate | 0.40 |
| Salt | 1.83 |
|  | 100.00 |

EXAMPLE 5

Tyloxapol was used in a yeast-raised doughnut system and found to produce many advantages over the control. With the mix employed, the dough contained 79% flour, final basis. Thirty pounds of mix were used, i.e., an equivalence of twenty-four pounds of flour. At 0.10% tyloxapol, flour basis, using tyloxapol-flour enrichment blend (49.9 g./cwt. to yield 0.10% tyloxapol), this required 11.976 g. of enrichment blend. The "mix" used here is like that used in Example 4 except that it also contained all the flour; the composition is given below.

Formula:

| | |
|---|---|
| Mix | 15 lbs. |
| Yeast | 12 ounces. |
| Water | 7 lbs., 8 ounces. |
| Tyloxapol | 0.10% by wt., flour basis. |

Procedure

Mix the sponge ingredients for one minute at low speed in a thirty-quart bowl and for four minutes at third speed. Ferment the sponge for two hours at 78–80° F. To the sponge add 15 lbs. of the mix, 6 ounces of yeast and 7 lbs. to 7 lbs., 8 ounces of water (the dough containing tyloxapol required 4 ounces less than the control). Mix the dough for one minute at low speed and for nine minutes at third speed to 81° F. dough temperature. Let it stand ten minutes. Extrude the dough through 1.5" ring cutters at 28–26 pounds per sq. inch of pressure, 13.3 ounces of dough per dozen. Proof at 128° D.B. (dry bulb–82° F. W.B. (wet bulb). Fry for forty-five seconds per side at 375° F.

Comparison of the tyloxapol formulation with the control:

(a) Took slightly less water than the control, although not a significantly smaller quantity.
(b) Mixed out one minute sooner than the control.
(c) Was not observably different at cutting.
(d) Showed slightly faster proof than the control.
(e) Yielded more volume—wider white lines on the finished doughnut.
(f) Finished product fluffier and more tender than the control.
(g) Not observably different than the control in glaze application.
(h) Keeping quality; better than the control by one day. This is a significant difference since two days is the maximum now allowable.
(i) There was no detectable difference in flavor between the test and the control.

The doughnut mix composition used in this example contained the following ingredients (percent on a weight basis):

| Ingredient: | Percent |
|---|---|
| Flour | 78.60 |
| Shortening | 7.00 |
| Lecithin | 2.00 |
| Sucrose | 3.80 |
| Dextrose | 1.90 |
| Salt | 1.30 |
| Defatted soy flour | 1.10 |
| Chemical leavening | 0.50 |
| Dried egg yolk | 1.00 |
| Yeast food (Arkady) | 0.75 |
| Non fat dry milk solids | 0.90 |
| Mono and diglycerides | 1.15 |
| | 100.00 |

EXAMPLE 6

This example shows the effectiveness of tyloxapol as a dough conditioner and bread improver when added, either in aqueous solution or on a solid carrier, at the sponge stage in a sponge and dough system. As in the previous examples, the aqueous solution contained 7 g. of tyloxapol in 1 liter of solution. The solid carrier was hydrous calcium silicate (Micro-Cel® E, preparation given below) and the combination, a powder, consisted of 75% of tyloxapol and 25% of hydrous calcium silicate. Six preparations (1–6) were carried out with the aqueous solution of tyloxapol; four (7–10) with the blend of tyloxapol on the carrier; four (11–14) with the carrier (hydrous calcium silicate) above; and, two controls (15–16) with no additives.

SPONGE AND DOUGH FORMULA

| Weight, grams: | 80% Sponge | 20% Dough |
|---|---|---|
| Flour | [1] 560 | [1] 140 |
| Water | 336 | 80.5 |
| Yeast | 17.5 | |
| Yeast food | 3.5 | |
| Shortening (lard) [2] | | 21 |
| Sugar | | 42 |
| Salt | | 14 |
| Tyloxapol | [3] | |
| Carrier | [3] | |

[1] Flour adjusted to 14% moisture basis.
[2] In runs 1 and 16, 21 g. of vegetable shortening (Crisco®) was used instead of lard.
[3] Variable, as given below.

Procedure

Same as given in Example 1 above with the variations of sheeting at 9/32" instead of 5/16" and of proofing the loaves for sixty-five rather than sixty minutes. The results are presented in three separate tables below. In each run the mixing time was nine minutes, the percent flour moisture was 12.2, and percent absorption at 14% moisture basis was 59.5%.

TYLOXAPOL ADDED IN AQUEOUS SOLUTION

| Dough Number | 1 | 2 | 3 | 4 | 5 | 6 |
|---|---|---|---|---|---|---|
| Percent Tyloxapol | 0.06 | 0.06 | 0.075 | 0.06 | 0.075 | 0.06 |
| Av. loaf wt., g | 452.5 | 449.5 | 451.5 | 452 | 450 | 454 |
| Av. loaf vol., cc | 2,913 | 3,038 | 3,200 | 3,063 | 3,175 | 3,063 |
| Spec. vol., cc./g | 6.55 | 6.76 | 7.09 | 6.78 | 7.06 | 6.75 |
| Score of Product: | | | | | | |
| Volume | 14 | 14.5 | 15 | 14.5 | 15 | 14.5 |
| Crust Color | 5 | 5 | 5 | 5 | 5 | 5 |
| Symmetry | 4.8 | 4.8 | 4.8 | 4.8 | 4.8 | 4.8 |
| Break and Shred | 4.7 | 4.4 | 4.8 | 5 | 4.5 | 4.5 |
| Grain | 18.9 | 19.3 | 19 | 18.8 | 19.1 | 18.7 |
| Texture | 18 | 19 | 19 | 19 | 18.8 | 19 |
| Color | 9 | 9 | 9 | 9 | 9 | 9 |
| Aroma and Taste | 20 | 20 | 20 | 20 | 20 | 20 |
| Total Score | 94.4 | 96.0 | 96.6 | 96.1 | 96.2 | 95.5 |

TYLOXAPOL ADDED ON SOLID CARRIER

| Dough Number | 7 | 8 | 9 | 10 |
|---|---|---|---|---|
| Percent Tyloxapol | 0.06 | 0.075 | 0.06 | 0.075 |
| Percent Carrier | 0.02 | 0.025 | 0.02 | 0.025 |
| Avg. loaf wt., g | 450 | 447 | 450.5 | 449 |
| Avg. loaf vol., cc | 3,013 | 3,088 | 2,988 | 3,013 |
| Spec. vol., cc./g | 6.70 | 6.91 | 6.63 | 6.71 |
| Score of Product: | | | | |
| Volume | 14.4 | 14.8 | 14.2 | 14.4 |
| Crust Color | 5 | 5 | 5 | 5 |
| Symmetry | 4.8 | 4.5 | 4.8 | 4.8 |
| Break and Shred | 4.7 | 4.6 | 4.3 | 4.8 |
| Grain | 19.1 | 18 | 18 | 18.8 |
| Texture | 18.8 | 18 | 18.5 | 18.5 |
| Color | 9 | 8.8 | 8.8 | 9 |
| Aroma and Taste | 20 | 20 | 20 | 20 |
| Total Score | 95.8 | 83.7 | 93.5 | 93.3 |

CARRIER ALONE OR NO ADDITIVE

| Dough Number | 11 | 12 | 13 | 14 | 15 | 16 |
|---|---|---|---|---|---|---|
| Percent Carrier | 0.02 | 0.025 | 0.2 | 0.025 | None | None |
| Avg. loaf wt., g | 452 | 448.5 | 449.5 | 449.5 | 450 | 452.5 |
| Avg. loaf vol., cc | 2,838 | 2,975 | 3,013 | 3,000 | 2,800 | 2,950 |
| Spec. vol., cc./g | 6.28 | 6.63 | 6.70 | 6.67 | 6.22 | 6.5 |
| Score of Product: | | | | | | |
| Volume | 13.5 | 14.2 | 14.4 | 14.3 | 13.3 | 14 |
| Crust Color | 4.8 | 4.8 | 4.8 | 4.8 | 5 | 5 |
| Symmetry | 4.5 | 4.8 | 4.5 | 4.8 | 4.5 | 4.8 |
| Break and Shred | 4 | 4.5 | 4.4 | 5 | 4.3 | 4.5 |
| Grain | 18.9 | 18.7 | 18.9 | 18.9 | 18.9 | 19.3 |
| Texture | 18.8 | 18.8 | 18.8 | 18.8 | 18 | 18.3 |
| Color | 8.8 | 8.8 | 8.8 | 8.8 | 9 | 9 |
| Aroma and Taste | 20 | 20 | 20 | 20 | 20 | 20 |
| Total Score | 93.3 | 94.6 | 94.6 | 95.4 | 92.0 | 94.9 |

Observations

Fermentation rise was good for all doughs. The doughs containing tyloxapol (1–6 and 7–10) handled better than those with the carrier alone (11–14) or with no carrier (15–16). The best results were obtained using the tyloxapol in aqueous solution (1–6).

Preparation of tyloxapol-hydrous calcium silicate blend

This preparation was carried out in a Patterson-Kelly liquids-solids blender. This blender consists of a V-shaped cylindrical container which rotates at a relatively low speed. Inside, there is a high speed intensifier bar which has blades on discs, through which the liquid is introduced into the blender and distributed throughout the mix by the action of the blade tips. The blender is charged through easy open access doors at either end of the V-shaped cylinder. The finished blend is discharged at the apex of the "V." The unit is constructed of stainless steel and uses a Viking gear pump to feed the liquid into the blender. Other suitable blenders or blending procedures can be used.

Preparation of a 1160 g. batch of the tyloxapol-silicate blend is carried out using said blender of eight quart capacity as follows: The hydrous calcium silicate (290 g. of Micro-Cel E) is placed in the blender and the tyloxapol (870 g.), heated to 65° C., is added through the pump at a rate of about 250 g. per minute. The total mix time is four and one-half minutes from start of tyloxapol addition to turning off the blender.

The hydrous calcium silicate is prepared according to the directions given in U.S. Patent 2,966,441, issued Dec. 27, 1960.

EXAMPLE 7

This example shows the effectiveness of tyloxapol as a dough conditioner and bread improver when used in a continuous mix system; it also provides a comparison of these results with those obtained using a commercial dough conditioner, i.e., calcium stearyl-2 lactylate (Verv Ca). The tyloxapol was added as the 75–25% blend of tyloxapol on hydrous calcium silicate as a carrier, as described in Example 6. Verv Ca was added at the level of 0.5% and the blend was added at two levels, 0.10% and 0.133% (equivalent to 0.075% and 0.10%, respectively, of tyloxapol).

The equipment used was a laboratory scale continuous mix unit which is identical in performance with commercial units but is designed for wider experimental control and for much smaller scale operaton.

The procedure is basically that of (a) making a "brew" and (b) blending (or developing) this simultaneously with the other ingredients to form a continuous dough. Each of the runs was based upon the total usage of 50 kg. of flour. Each brew contained a large proportion (88.2%) of the water used, 25% of the flour, all of the yeast, all of the yeast food, 25% of the sugar, all of the salt, and all of the mold inhibitor (calcium propionate). It also contained the tyloxapol-silicate blend or calcium stearly-2-lactylate (Verv Ca). The tyloxapol-silicate blend was first dispersed in two pounds of the water and then added to the remainder of the brew material. The ingredients added at the brew and developer stages are listed as follows:

| | Stage Added | |
|---|---|---|
| | Brew | Developer |
| Ingredient (Wt., g.): | | |
| Water | 30,000 | 4,000 |
| Flour | 12,500 | 37,500 |
| Yeast | 1,625 | |
| Yeast food | 375 | |
| Sugar | 1,000 | 3,000 |
| Salt | 1,000 | |
| Calcium propionate | 50 | |
| Milk | | 1,500 |
| Oxidant [1] | | [1] 5.45/0.45 |
| Blend [2] or Verv Ca | | ([3]) |

[1] KBrO$_3$/KIO$_3$ in ratio of about 12.1 to 1.
[2] 75-25% blend of tyloxapol on hydrous calcium silicate.
[3] A—control; B—250 g. Verv Ca; C—50 g. of blend, i.e., 37.5 g. of tyloxapol; D—66.5 g. blend, i.e., 52.4 g. of tyloxapol.

After completion of the brew fermentation (two and one-half hours at 78° F.), the brew and the developer ingredients were brought together, by use of proper metering devices, into a section of the equipment called the incorporator. Here the various ingredients were preliminarily blended and the blend was then pumped into the unit called the developer, or "developing head," where the mixing, or development of the dough, took place. The amount of development of the dough was governed by the rate of through-put and the rotational speed of the elements in the developing head. In this preparation, the control dough (A) was run at three mixing speeds, 195, 185 and 175 r.p.m.; the Verv Ca dough (B) was run at 175, 185, 190 and 195 r.p.m.; doughs containing 0.1% of blend (C) were run at 175, 180, and 185 r.p.m.; doughs containing 0.133% of blend (D) were run at 180, 185, 190 and 195 r.p.m.

As the dough was mixed in the developer head, it was continuously extruded and, when proper development had been obtained, eight (or four) sections of each dough at each mixing speed were cut off to yield units of about 17 ounces. These dough sections fell directly into pans which were then placed in a proof box and allowed to rise to ⅞" above the top of the pan in which it was to be baked. At the completion of the proof period, half of the loaves of each proof dough, i.e., four (or two) loaves, were then placed in the oven and baked for sixteen minutes at 450° F., after which they were removed, cooled for one hour, weighed and the volume of the loaf was then measured by displacement.

Strength imparted to the dough by tyloxapol and Verv Ca was demonstrated by subjecting the other four (or two) loaves of each dough to a "shock test" to simulate the type of mal-handling that might occur in commercial practice. This test consisted of placing the proofed loaves on a four foot section of roller conveyor, inclined at 15 degrees, and allowing the pan and contents to "free fall" the full length of this conveyor to a dead stop at the low end. The effect of this shock treatment was extremely notable on the loaves from the control dough (A), since these loaves did not have sufficient dough strength to withstand such treatment (which simulates possible commercial mechanical dough handling) and were partially degassed, as easily noted visually. This is also apparent in the lower volume of the finished baked loaves from the "shocked" control doughs, as given in the tables below. The doughs containing the tyloxapol or Verv Ca did not recede noticeably and little difference could be noted in the finished bread between loaves from "shocked" or "non-shocked" doughs containing these additives.

The volume and weight data are presented in the following four tables: A—Control; B—Use of 0.5% Verv Ca; C—Use of 0.10% Tyloxapol-Silicate Blend (i.e., 0.075% of tyloxapol); and, D—Use of 0.133% Tyloxapol-Silicate Blend (i.e., 0.10% tyloxapol).

A—Control

| Mixing Speed, r.p.m | 185 | 185 | 175 | 175 | 195 | 195 |
|---|---|---|---|---|---|---|
| Reg.[1] Av. wt., g | 410 | 405 | 515 | 419 | 416 | 418 |
| Sh.[2] Av. wt., g | 418 | 410 | 415 | 418 | 410 | 412 |
| Reg.[1] Av. vol., cc | 2,625 | 2,587 | 2,695 | 2,695 | 2,588 | 2,825 |
| Sh.[2] Av. vol., cc | 2,060 | 2,225 | 2,515 | 2,325 | 2,263 | 2,050 |
| Reg.[1] Sp. vol., cc./g | 6.40 | 6.39 | 6.49 | 6.43 | 6.22 | 6.76 |
| Sh.[2] Sp. vol., cc./g | 4.93 | 5.43 | 6.06 | 5.56 | 5.52 | 4.97 |

[1] Reg.=Regular loaves.
[2] Sh.=Shocked loaves.

B—Use of 0.5% Verv Ca

| Mixing Speed, r.p.m | 185 | 185 | 175 | 175 | 195 | 190 |
|---|---|---|---|---|---|---|
| Reg.[1] Av. wt., g | 424 | 420 | 411 | 410 | 415 | 412 |
| Sh.[2] Av. wt., g | 416 | 406 | 411 | 411 | 411 | 414 |
| Reg.[1] Av. vol., cc | 2,605 | 2,637 | 2,598 | 2,690 | 2,560 | 2,610 |
| Sh.[2] Av. vol., cc | 2,525 | 2,675 | 2,673 | 2,712 | 2,570 | 2,675 |
| Reg.[1] Sp. vol., cc./g | 6.14 | 6.28 | 6.32 | 6.56 | 6.17 | 6.33 |
| Sh.[2] Sp. vol., cc./g | 6.07 | 6.54 | 6.58 | 6.59 | 6.25 | 6.46 |

[1] Reg.=Regular loaves.
[2] Sh.=Shocked loaves.

C—USE OF 0.10% TYLOXAPOL-SILICATE BLEND

| Mixing Speed, r.p.m. | 185 | 185 | 175 | 175 | 180 | 180 |
|---|---|---|---|---|---|---|
| Reg.[1] Avg. wt., g | 404 | 380 | 413 | 407 | 406 | 40 |
| Sh.[2] Avg. wt., g | 407 | 382 | 408 | 402 | 402 | 406 |
| Reg.[1] Avg. vol., cc | 2,505 | 2,490 | 2,712 | 2,783 | 2,565 | 2,585 |
| Sh.[2] Avg. vol., cc | 2,562 | 2,565 | 2,770 | 2,830 | 2,660 | 2,615 |
| Reg.[1] Sp. vol., cc./g | 6.20 | 6.55 | 6.57 | 6.84 | 6.32 | 6.41 |
| Sh.[2] Sp. vol., cc./g | 6.29 | 6.71 | 6.78 | 7.03 | 6.62 | 6.44 |

[1] Reg.=Regular loaves.
[2] Sh.=Shocked loaves.

D—USE OF 0.133% TYLOXAPOL-SILICATE BLEND

| Mixing Speed, r.p.m. | 190 | 190 | 180 | 180 | 185 | 185 | 195 |
|---|---|---|---|---|---|---|---|
| Reg.[1] Ave. wt., g | 416 | 411 | 404 | 396 | 404 | 407 | 418 |
| Sh.[2] Avg. wt., g | 404 | 407 | 406 | 391 | 405 | 403 | 415 |
| Reg.[1] Avg. vol., cc | 2,730 | 2,580 | 2,675 | 2,682 | 2,710 | 2,595 | 2,515 |
| Sh.[2] Avg. vol., cc | 2,680 | 2,605 | 2,710 | 2,663 | 2,665 | 2,645 | 2,602 |
| Reg.[1] Sp. vol., cc./g | 6.66 | 6.28 | 6.62 | 6.77 | 6.71 | 6.44 | 6.02 |
| Sh.[2] Sp. vol., cc./g | 6.63 | 6.40 | 6.67 | 6.81 | 6.58 | 6.56 | 6.27 |

[1] Reg.=Regular loaves.
[2] Sh.=Shocked loaves.

On the following day the above baked loaves were scored, and the best loaves were picked from each series and stored for five days at ambient room temperature (about 80° F.). After this time, softness tests based on the degree of bread crumb compressibility were run and it was found that the loaves of bread containing tyloxapol and Verv Ca were softer than the control bread. It was also found that the bread obtained by using 0.133% of the tyloxapol-silicate blend (i.e., 0.10% tyloxapol) was just as soft as the bread obtained by using 0.5% Verv Ca.

We claim:
1. In the preparation of leavened products wherein flour and other conventional ingredients are employed in a baking mix, the improvement which comprises incorporating in the baking mix from about 0.02 to about 0.15% by weight based on flour, of tyloxapol.

2. The process according to claim 1 using about 0.05 to about 0.10% of tyloxapol.
3. The process according to claim 1 wherein loaf bread is prepared using about 0.05 to about 0.10% of tyloxapol.
4. A baked leavened product prepared according to claim 1 from a baking mix containing from about 0.02 to about 0.15% by weight, based on flour, of tyloxapol.
5. An unbaked leavened product prepared according to claim 1 from a baking mix containing from about 0.02 to about 0.15% by weight, based on flour, of tyloxapol.

References Cited

UNITED STATES PATENTS 3,272,700  9/1966  Shupe _____ 167—52

FOREIGN PATENTS 97,722  12/1939  Sweden.

A. LOUIS MONACELL, Primary Examiner

J. R. HOFFMAN, Assistant Examiner

U.S. Cl. X.R.
99—86, 94

PO-1050
(5/69)

UNITED STATES PATENT OFFICE
CERTIFICATE OF CORRECTION

Patent No. 3,482,994    Dated December 9, 1969

Inventor(s) Chester W. Ofelt et al.

It is certified that error appears in the above-identified patent and that said Letters Patent are hereby corrected as shown below:

Column 1, line 22, "baker" should read --baked--. Column 2 line 8, "genericall" should read --generically--; line 21, "i.e." should read --e.g.--. Column 3, line 1, "for" should read --or--. Column 4, in the table between lines 42-60, "Percent Tyloxapol" for "Dough Number 2" should be changed from "0.01" to read --0.0 Columns 5-6, in the table, the "Grain Score" for "Dough Number 1 should be changed from "18.2" to read --18.5-- and the "Texture Score" should be changed from "19.5" to read --19.2--. Column 6 line 63, "malter" should read --malted--. Column 7, line 32, "bulb-" should read -- bulb)- --. Column 8, line 60, "83.7" sho read --93.7--, "93.5" should read --93.6-- and "93.3" should rea --95.3--; in the table between the lines 61-71, the "Spec. vol." for "Dough No. 16" should be changed from "6.5" to read --6.52-- last line, "92.0" should read --93.0--. Column 9, line 38, "2 lactylate" should read -- 2-lactylate.--; line 57, "stearly" should read --stearyl--. Column 10, line 60, "515" should read --415--. Column 11, line 3, "40" should read --403--; line 35, after "weight" insert a comma.

SIGNED AND
SEALED
JUN 23 1970

(SEAL)
Attest:

Edward M. Fletcher, Jr.
Attesting Officer

WILLIAM E. SCHUYLER, JR.
Commissioner of Patents